Patented Dec. 20, 1932

1,891,333

UNITED STATES PATENT OFFICE

HANS MEERWEIN AND HEINRICH MORSCHEL, OF KONIGSBERG, GERMANY, ASSIGNORS TO THE FIRM SCHERING-KAHLBAUM A. G., OF BERLIN, GERMANY

PRODUCTION OF ACETONE

No Drawing. Application filed June 5, 1928, Serial No. 283,121, and in Germany April 22, 1927.

Our invention refers to the production of acetone and more especially to means whereby acetone can be produced from certain organic compounds including acetaldehyde and ethyl alcohol in a particularly economical and efficient manner.

We have found that if acetaldehyde vapour is caused to pass together with steam in excess over suitable contact substances heated to 300 to 500° C., carbon dioxide and hydrogen will be split off, and the acetaldehyde will thus be readily converted into acetone.

As suitable contact substances may be used mixtures of an oxide of tin with an oxide of thorium, zirconium, zinc or cerium or an oxide of another rare earth metal. Mixtures of the oxides of tin and cerium have been found to be particularly efficient. The oxides may also be replaced by salts of the metals above mentioned, which under the particular conditions of operation will be converted into the oxides, for instance carbonates, formates, acetates and oxalates.

The proportions of the single oxides in these mixtures may be varied within wide limits. Instead of using such oxide mixtures, we may also use mixtures of the oxides of tin with the carbonates of an earth alkali. All these contact masses have an excellent catalytic efficiency and great stability. Instead of the carbonates also such salts of earth alkalis can be used which are converted during the operation into the carbonates, such as for instance acetate or oxalates. The proportions of the several constituents of these mixtures can also be varied within wide limits.

The carbonates of the earth alkalis, if used by themselves, will not bring about a conversion of the mixture of acetaldehyde and steam into acetone, but will exert in a well known manner a condensing action on the acetaldehyde, leading to the formation of crotonic aldehyde and other products boiling at higher temperature and not readily soluble in water. Contrary to what could be expected, if the earth alkali carbonates are combined with the oxides of tin, this condensing action will not show, but a smooth and practically complete conversion of acetaldehyde into acetone will take place without any material formation of by-products.

It is well known that ethyl alcohol can be converted under the influence of catalysts having a dehydrating effect into acetaldehyde at an elevated temperature. Such catalysts are the oxides of tin. Therefore the catalysts mentioned above as inducing the conversion of acetaldehyde into acetone, and containing oxides of tin, are also adapted for converting ethyl alcohol in a single operation direct into acetone. For the conversion of ethyl alcohol as well as acetaldehyde into acetone a mixture of stannic oxide or stannous oxide with cerium oxide has shown to be an excellent catalyst. If this catalyst is used, 93 to 95 per cent of the calculated amount of acetone can be obtained from ethyl alcohol as well as from acetaldehyde. If the exhaust gases are washed with high boiling solvents or by adsorption with active carbon the yield can be improved further by several per cent. The reaction product after a single passage over the catalyst at 420° C. does not contain any alcohol nor any acet-aldehyde, only a very small quantity about .6 per cent) of acetic acid.

As is well known, all catalytic processes depend both technically and commercially upon the stability or duration of life of the catalysts used. We have found that during an operation lasting three weeks without any interruption, in which a catalyst composed of tin oxide and cerium oxide was used, the yield of acetone only changed from 94 per cent recovered at the beginning to 92 per cent recovered at the end of the three weeks. The gas composition at the end of the operation was as follows:

| | Per cent |
|---|---|
| $CO_2$ | 19.3 |
| $CO$ | 0 |
| $CH_4$ | 2.3 |
| $H_2$ | 78.2 |

The quantity of gases split off corresponded to the calculated quantity.

The catalyst mixtures required in this process are obtained either by direct mixing of the single catalysts or by simultaneous precipitation of the metal salts, quite especially the nitrates, chlorides or acetates, with ammonia, ammonium carbonate or sodium carbonate, followed by washing and drying. The proportion of oxides in these mixtures can be varied within wide limits. In order to obtain a large surface it may be useful to precipitate the catalysts on inert carriers such as pumice stone, pieces of earthen ware or the like or to mix them with such carriers.

The proportion of alcohol to steam in the mixture to be treated may be varied also within wide limits. We have, however, found that it is not to be recommended to use less than 2 parts by weight of water to 1 part by weight of alcohol or acetaldehyde.

The temperature of reaction must be as low as possible in order to avoid decomposition and the formation of condensation products, which would take place at higher temperatures. We have found that if efficient catalysts are used, a temperature between 370 and 420° C. will give the best results.

The mixture of acetone and steam, which escapes from the reaction vessel, is preferably cooled down only so far that substantially only the steam is condensed, while the condensation of acetone shall take place only in a second cooling or condensing device. The water resulting in the condensation, after having been mixed with the corresponding quantity of alcohol or acetaldehyde, is returned into the reaction chamber. By thus proceeding, all losses of acetone and of such quantities of the starting materials or intermediate products, which should not have been converted completely, are avoided.

Example 1

160 grams ceri-ammonium nitrate and 160 grams stannic chloride hydrate are dissolved in water and after the addition of 300 grams pumice stone the solution is precipitated with ammonia. The catalyst is washed and dried and 6 litres of a watery solution of acetaldehyde containing 720 grams acetaldehyde are conducted over it during 60 hours at 420–430° C. On this condensate being subjected to suitable treatment there are obtained 447 grams acetone=94.3 per cent of the calculated quantity and 6 grams acetic acid=0.6 per cent, no acetaldehyde being present. The quantity of gases split off corresponded to the calculated one, the exhaust gases being composed as follows:

|  | Per cent |
|---|---|
| $CO_2$ | 32.9 |
| $CO$ | 0 |
| $CH_4$ | 2.3 |
| $H_2$ | 64.8 |

Example 2

A mixture of 125 grams stannic chloride hydrate and 100 grams crystallized calcium nitrate are dissolved in water, mixed with 230 grams pumice stone, precipitated with ammonium carbonate and the precipitate filtered by suction, washed and dried. The catalyst thus obtained is placed in the contact oven and 1900 ccms. of a mixture of acetaldehyde and water containing 227 grams acetaldehyde is conducted during 17 hours over the catalyst at 440° C. By suitably treating the condensate one obtains 180 grams pure acetone, corresponding to 87 per cent of the calculated quantity. One obtains further 4.5 grams=1.5 per cent acetic acid, while 9 grams=4 per cent acetaldehyde are recovered. The quantity of gases split off was equal to the calculated quantity. The gas had the following composition:

|  | Per cent |
|---|---|
| $CO_2$ | 32 |
| $H_2$ | 64.5 |
| $CH_4$ | 3.6 |

Analogous results are obtained if a contact mass is used which is formed from 115 grams stannic chloride hydrate, 80 grams barium nitrate and 230 grams pumice stone.

Example 3

100 grams cerium chloride and 125 grams stannic chloride hydrate are dissolved in water, 225 grams pumice stone are added and the mixture is precipitated with ammonia. The precipitate is washed and dried and 1600 ccms. of dilute alcohol, containing 240 grams alcohol, are conducted over it at 425° C. within 23½ hours. There were obtained 140 grams pure acetone=92.6 per cent of the calculated quantity and 2.1 grams=0.6 per cent acetic acid. The quantity of gases split off was almost equal to the calculated one and the gas was composed as follows:

|  | Per cent |
|---|---|
| $CO_2$ | 19.7 |
| $H_2$ | 76.2 |
| $CO$ | 0.4 |
| $CH_4$ | 3.7 |

Similar results, which were not always as equally favourable as those described before, were obtained with the combination stannous oxide-zinc oxide.

By suitably washing the gases the yield can be increased materially.

Example 4

115 grams stannic chloride hydrate and 80 grams barium nitrate are dissolved in water, 230 grams pumice stone are added and the mixture is precipitated with ammonium carbonate. Over the catalyst, after it has been washed and dried, are conducted within 16½ hours at 425° C. 1650 ccms. dilute alcohol containing 224.4 grams alcohol. There were obtained 112 grams pure acetone=80 per cent of the calculated quantity and 3.4 grams acetic acid=1.2 per cent. The gas split off had the following composition:

|  | Per cent |
|---|---|
| $CO_2$ | 20 |
| $H_2$ | 77 |
| $CH_4$ | 3 |

When operating under the same conditions but using a catalyst being a mixture of stannous oxide and calcium carbonate substantially the same results were obtained.

*Example 5*

160 grams ceri-ammonium nitrate and 160 grams stannic chloride hydrate are dissolved in water, 300 grams pumice stone are added and the mixture is precipitated with ammonia. Over the washed and dried catalyst are conducted at about 425° C. within about 3 weeks (504 hours) 30 litres of a dilute alcohol containing 4600 grams alcohol. There were obtained in this manner 2700 grams acetone = 93.3 per cent of the calculated quantity and 30 grams = 0.5 per cent acetic acid.

By using acetaldehyde as starting material analogous results were obtained.

*Example 6*

125 grams thorium nitrate and 135 grams stannic chloride hydrate are dissolved in water, 225 grams pumice stone are added and the mixture is precipitated with ammonia. Over the catalyst thus obtained were conducted within 200 hours at 440–450° C. 16.7 litres of a dilute alcohol containing 2500 grams alcohol. There were obtained 1320 grams acetone = 83.8 per cent of the calculated quantity, 89 grams acetic acid = 2.7 per cent and 68 grams acetaldehyde = 2.8 per cent. The quantity of gases split off corresponded to the calculated quantity and the gas had the following composition:

|  | Per cent |
|---|---|
| $CO_2$ | 19.4 |
| CO | 0.0 |
| $CH_4$ | 3.8 |
| $H_2$ | 76.8 |

In the appended claims the term "oxygen compounds of the metals" shall include metal oxides, hydroxides and carbonates or other metal salts which under the particular conditions of reaction are converted into oxides or carbonates.

Various changes may be made in the details disclosed in the foregoing specification without departing from the invention or sacrificing the advantages thereof.

We claim:—

1. The method of producing acetone which comprises conducting a compound of the formula

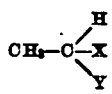

(wherein X may be hydroxyl and Y hydrogen or X+Y an oxygen atom) in the vapour phase together with steam over a contact mass containing a mixture of an oxide of tin with a compound of the group comprising the oxides of the rare earth metals or of thorium, zirconium and zinc and the carbonates of alkaline earth metals.

2. The method of producing acetone which comprises conducting a compound of the formula

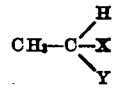

(wherein X may be hydroxyl and Y hydrogen or X+Y an oxygen atom) in the vapour phase together with steam over a contact mass containing a mixture of oxides of tin and cerium.

3. The method of producing acetone which comprises conducting ethyl alcohol in the vapour phase together with steam over a contact mass containing a mixture of an oxide of tin with a compound of the group comprising the oxides of the rare earth metals or of thorium, zirconium and zinc and the carbonates of alkaline earth metals.

4. The method of producing acetone which comprises conducting ethyl alcohol in the vapour phase together with steam over a contact mass containing a mixture of oxides of tin and cerium.

In testimony whereof we affix our signatures.

HANS MEERWEIN.
HEINRICH MORSCHEL.